(12) United States Patent
Maruyama et al.

(10) Patent No.: US 6,596,159 B1
(45) Date of Patent: Jul. 22, 2003

(54) AUTOMATIC REGENERATION VALVE FOR WATER SOFTENER

(75) Inventors: Shigeru Maruyama, Tokyo (JP); Yoshisada Furukawa, Tokyo (JP)

(73) Assignee: Maruyama Mfg. Co., Ltd., Tokyo (JP)

( * ) Notice: Subject to any disclaimer, the term of this patent is extended or adjusted under 35 U.S.C. 154(b) by 22 days.

(21) Appl. No.: 09/902,647

(22) Filed: Jul. 12, 2001

(30) Foreign Application Priority Data

Jul. 13, 2000 (JP) ........................................ 2000-213278

(51) Int. Cl.[7] .............................. C02F 1/42; B01J 49/00; F16K 11/07; F16K 31/04; F16K 31/524

(52) U.S. Cl. .................... 210/139; 210/140; 210/190; 210/269; 137/624.11; 137/624.18

(58) Field of Search .................. 210/89, 140, 190, 210/191, 278, 424, 425, 426, 139, 141; 137/624.14, 624.15, 624.17, 624.18, 624.2

(56) References Cited

U.S. PATENT DOCUMENTS

| | | | |
|---|---|---|---|
| 4,290,451 A | | 9/1981 | Fleckenstein et al. |
| 4,577,498 A | * | 3/1986 | Ferrali |
| 4,919,314 A | * | 4/1990 | Nishiyama et al. |

* cited by examiner

*Primary Examiner*—Joseph Drodge
*Assistant Examiner*—Terry K. Cecil
(74) *Attorney, Agent, or Firm*—Birch, Stewart, Kolasch & Birch, LLP

(57) ABSTRACT

A regeneration valve 131 is adapted for automatic activation of ion exchange resin in a water softener. The regeneration valve includes a switching valve 1, a control valve 32, a water injection valve 54, a cam mechanism (FIG. 13) and a timer mechanism which are compactly integrated in a single valve assembly. The timer mechanism includes a timer motor 80 provided with a switching gear adapted to be switched between 50 Hz and 60 Hz (FIGS. 16, 17). The ion exchange resin layer within the resin reservoir 2 can be uniformly activated so that the regeneration process can be achieved at a high efficiency.

5 Claims, 18 Drawing Sheets

(A)

(B)

(C)

AUTOMATIC REGENERATION VALVE FOR WATER SOFTENER

TECHNICAL BACKGROUND

The present invention relates to a regeneration valve adapted for automatic activation of ion exchange resin in a water softener.

Raw water supply to cooling/heating apparatus such as boiler, water heater or cooler is usually carried out in combination with the water softener connected to said apparatus. The water softener functions to remove hardening component of various types (e.g., alkaline-earth metal ion such as Ca cation or Mg cation) contained in raw water in order to avoid scale deposition. Particularly, the water softener of automatic regeneration type (hereinafter referred to simply as water softener) using ion exchange resin of Na cation type to remove the hardening component from raw water has been widely used.

In the water softener of this type, the hardening component is substituted with Na cation of the ion exchange resin and thereby removed from raw water. A break through point is reached as substitution of the hardening component with Na cation is saturated, whereupon the hardening component begins to leak into water being softened. At this point, the ion exchange resin is brought into contact with saline solution (NaCl) to reverse the precedent reaction and thereby to regenerate a hardening component removing ability. More specifically, the hardening component having been adsorped on the ion exchange resin is eluted therefrom and Na cation is adsorbed on the ion exchange resin.

An example of the apparatus using the regeneration valve used for the regenerating process as has been described above is disclosed in U.S. Pat. No. 4,290,451.

Construction of this well known apparatus will be briefly described in reference with FIG. 19 in the accompanying drawings.

Referring to FIG. 19, reference numeral (151) designates a resin reservoir filled with ion exchange resin (161) connected to a regeneration valve (152) including a piston (162). The regeneration valve (152) is connected to a water passage (153) vertically extending within the resin reservoir (151) substantially axially downward to the vicinity of a bottom of said resin reservoir (151). The water passage (153) is provided at its lower end with a water inlet (154).

The regeneration valve (152) includes, in addition to an electric motor serving to actuate a passage switching mechanism, a controlling timer mechanism (155). The latter is adapted to set the regeneration valve (152) to a position for regenerating process when a predetermined time point or a predetermined amount of raw water has been reached.

The regeneration valve (152) further includes members as following: a raw water inlet (156) through which the resin reservoir (151) is supplied with raw water; a softened water outlet (157) to discharge the amount of softened water free from the hardening component; a saline solution pipe (159) adapted to pump up an amount of saline solution from the saline solution reservoir (158) during the regenerating process and, at the end of this process, to fill up an amount of raw water necessary for preparation of saline solution to be used in the next regenerating process; and a drainage port (160) adapted to drain the amount of saline solution and excessive raw water having been used for regeneration. These members are appropriately provided at positions adapted for respective passages switched one from another in the respective steps of process.

An air chuck (164) having its inlet (163) in the vicinity of the bottom of the saline solution reservoir (158) is connected to the distal end of the saline solution pipe (159). The air chuck (164) functions to open the passage defined by said saline solution pipe (159) so far as the inlet (163) is immersed in water. The air chuck (164) functions to close said passage as the surface of water lowers to a level of said inlet (163). In this way, the air chuck (164) prevents any amount of air from entering the-saline solution pipe (159).

Within the saline solution reservoir (158), common salt (139) for reactivation of the ion exchange resin (161) and there is provided a salt filter having fine meshes. Said salt filter functions to prevent grains of common salt (139) from falling onto the bottom of the saline solution reservoir (158).

In the water softener of this type, switching of the regeneration valve (152) is effectuated by the controlling timer mechanism (155). Specifically, the valve (152) is switched from the position for collection of softened water to the position for regeneration of the ion exchange resin (161) depending on a predetermined condition. More specifically, switching occurs when a predetermined time or a predetermined discharged amount of softened water is reached.

Once the regeneration valve (152) has been switched to the position for the regenerating process, the steps of this process are successively carried out. These steps include those of "back washing", "regeneration of saline solution", "expelling saline solution", "washing" and "water injecting". As a result of these steps, the ion exchange resin (161) having its initial ability deteriorated now recovers it, allowing the valve (152) to recover the position for softened water collection.

Such regeneration valve (152) of the water softener usually comprises a piston (162) reciprocation of which causes increases in the number of steps included in the regenerating process to be increased to seven: first step of washing, first step of back washing, step of saline solution injecting, step of expelling saline solution, second step of back washing, second step of washing and step of water injecting.

The single piston (162) reciprocates across the passage associated with each step. In the steps of saline solution injecting/expelling out, forward stroke of the piston (162) causes saline solution to flow downward through the ion exchange resin layer. Then the amount of water having been reacted with the ion exchange resin is drained. In the step of back washing, backward stroke of the piston (162) causes raw water to flow upward through the ion exchange resin layer.

Consequently, most of saline solution flowing downward flows through the water inlet directly into said water duct (153) through the resin filter. This means that the ion exchange is limited to a central zone of the resin reservoir (151) and no regeneration occurs in the vicinity of a side wall of the resin reservoir (151).

In addition, the amount of water to be drained after completion of the reaction is drained through the ion exchange resin layer in the second step of back washing. However, this water flow is forced back by the amount of water flowing downward again in the second step of washing. While a certain amount of water is drained, a cycle in which these steps are repeated is too short to ensure the complete drainage after the step of expelling out. Actually, a considerable amount of water to be drained merely wanders within the ion exchange resin layer.

In view of these problems, it is a principal object of the present invention to provide a novel automatically regeneration valve in a water softener. This valve can automate the entire process of activating the ion exchange resin with saline solution so that said resin within a reservoir thereof may be uniformly regenerated.

DISCLOSURE OF THE INVENTION

The object set forth above is achieved, according to the present invention, by a water softener having components as following: a resin reservoir filled with ion exchange resin; a saline solution reservoir containing saline solution used to regenerate said ion exchange resin; and an automatic regeneration valve. To this automatic regeneration valve, a plurality of ducts are connected. Namely, a raw water duct supplying said resin reservoir with raw water; a softened water duct feeding the amount of water having been softened in said resin reservoir forward; a drained water duct draining the amount of water used to regenerate said ion exchange resin; and a saline solution duct for suction as well as injection from and to said saline solution reservoir. Said automatic regeneration valve may be switched at a predetermined switched to switch a step of softened water collection to successive steps of a process for ion exchange, resin regeneration. Said automatic regeneration valve comprises a switching valve, a control valve, water injection valve, a cam mechanism and a timer mechanism.

The switching valve may contain therein a plurality of switching pistons having their piston rods each extending vertically. According to this embodiment, the steps of the regenerating process successively take place as positions of these switching pistons are switched. In this way, the process of regeneration is reliably carried out with a relatively simplified construction. The cam mechanism may include a drainage valve actuating cam, a saline solution valve actuating cam and a regeneration control lever. Such construction enables the process of regeneration to be continuously carried out.

A regeneration control lever provided in the cam mechanism may be actuated by a timer mechanism. The timer mechanism may comprise a timer motor provided with a switching gear adapted to be switched between 50 Hz and 60 Hz. The timer motor of the timer mechanism may be provided with a conversion gear so that this conversion gear can be operated to switch a regeneration mode to a manual regeneration mode.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
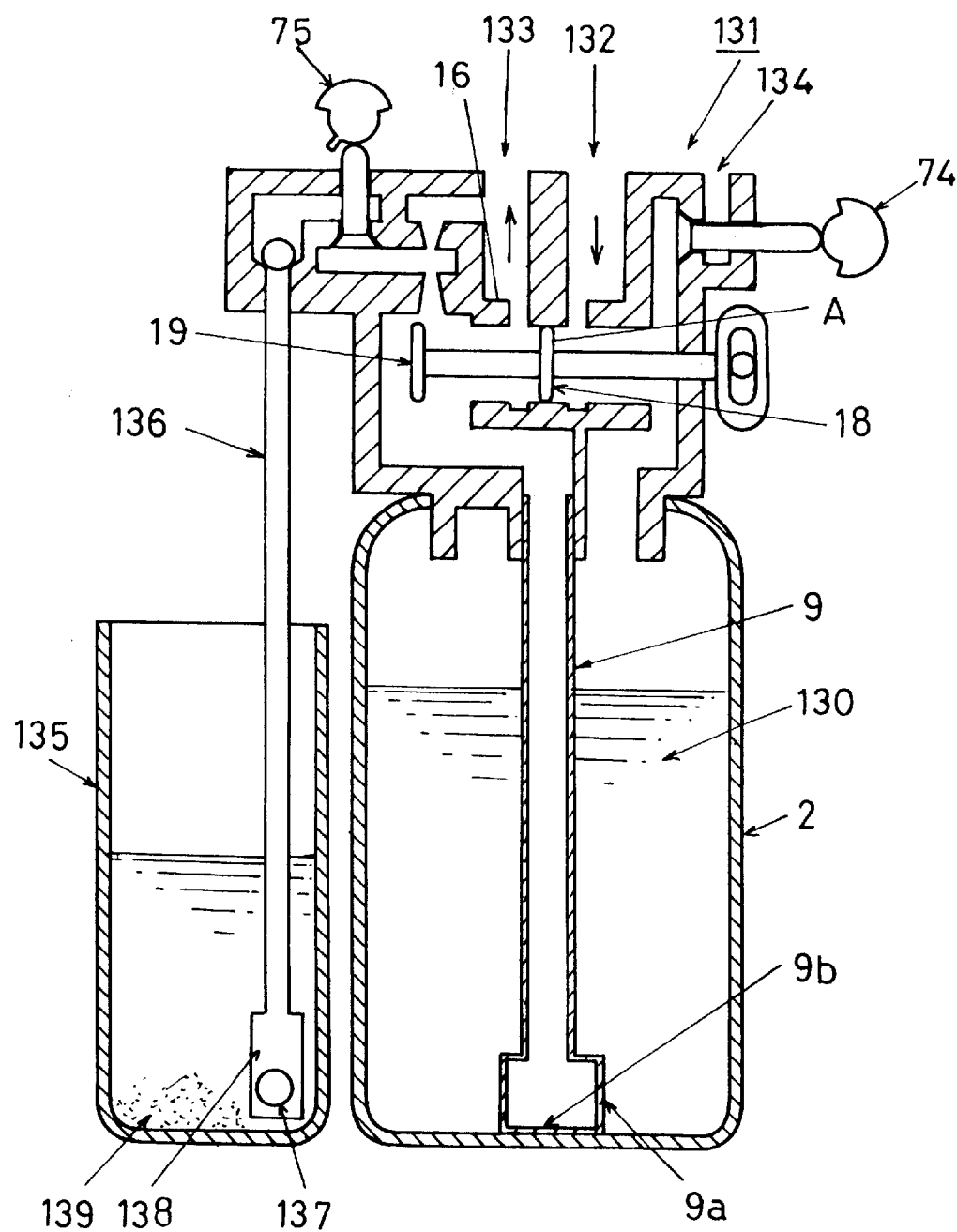
FIG. 1 is an axial sectional view as viewed from the front, schematically illustrating a water softener according to the present invention.

FIG. 1 schematically illustrates the water softener according to the present invention as a whole.

A resin reservoir (2) is filled with ion exchange resin (130) and connected to an automatic regeneration valve (131). A water duct (9) extends downward from the automatic regeneration valve (131) substantially along an axis of the resin reservoir (2) to a bottom of said resin reservoir (2). The water duct (9) is provided on its lower end with a water inlet (9b) having a resin filter (9a).

The automatic regeneration valve (131) includes, in addition to an electric motor serving as a power source for a passage switching mechanism, a controlling timer mechanism. The timer mechanism controls the automatic regeneration valve (131) to operate at a desired position for the regenerating process as a predetermined time point or amount of processed water is reached.

The automatic regeneration valve (131) further includes members as following: a raw water inlet (132) through which the resin reservoir (2) is supplied with raw water; a softened water outlet (133) to discharge the amount of softened water free from the hardening component; a saline solution pipe (136) adapted to pump up an amount of saline solution from the saline solution reservoir (135) during the regenerating process and, at the end of this process, to fill up an amount of raw water necessary for preparation of saline solution to be used in the next regenerating process; and a drainage port (134) adapted to drain the amount of saline solution having been used for regeneration together with an excessive amount of water having been used for preparation of saline solution. These members are appropriately provided at positions adapted for respective passages switched one from another in the respective steps of process.

Obviously, said raw water inlet (132), softened water outlet (133) and drainage port (134) are associated with respective pipes.

An air chuck (138) having its inlet (137) in the vicinity of the bottom of the saline solution reservoir (135) is connected to the distal end of the saline solution pipe (136). The air chuck (138) functions to open the passage defined by said saline solution pipe (136) so far as the inlet (137) is immersed in water. The air chuck (138) functions also to close said passage as the surface of water lowers to a level of said inlet (137). In this way, the air chuck (138) prevents any amount of air from entering the saline solution pipe (136).

Within the saline solution reservoir (135), common salt (139) for reactivation of the ion exchange resin (130) is stored and there is provided a salt filter (not shown) having fine meshes. Said salt filter functions to prevent grains of common salt (139) from falling onto the bottom of the saline solution reservoir (135).

In the water softener of this type, switching of the automatic regeneration valve (131) is effectuated by the controlling timer mechanism. Specifically, the valve (131) is switched from the position for collection of softened water to the position for regeneration of the ion exchange resin (130) depending on a predetermined condition. More specifically, switching occurs when a predetermined time or a predetermined discharged amount of softened water is reached.

Once the regeneration valve (131) has been switched to the position for the regenerating process, the steps of this process are successively carried out. These steps include those of "back washing", "regeneration of saline solution", "expelling out", "washing" and "water injecting". As a result of these steps, the ion exchange resin (130) having its initial ability deteriorated now recovers it, allowing the valve (131) to recover the position for softened water collection.

The automatic regeneration valve comprises a switching valve, a control valve, a water injecting valve, cam mechanism and a timer mechanism. A regeneration control lever actuates these valves and said cam mechanisms in operative association one with another under control by said timer mechanism to carry out the process of automatic regeneration.

Figure 2:
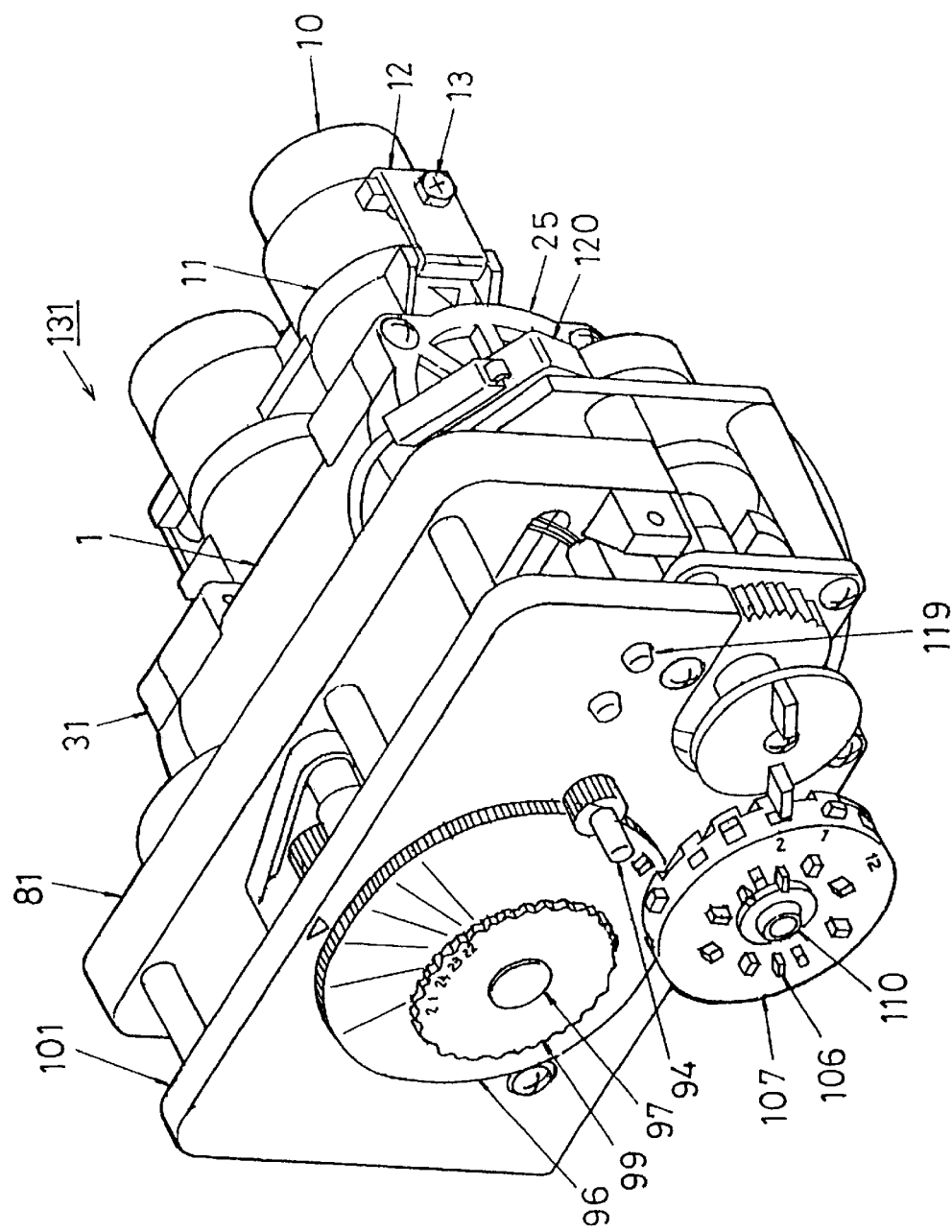
FIG. 2 is a perspective view of an automatic regeneration valve incorporated in the water softener.
Figure 3:
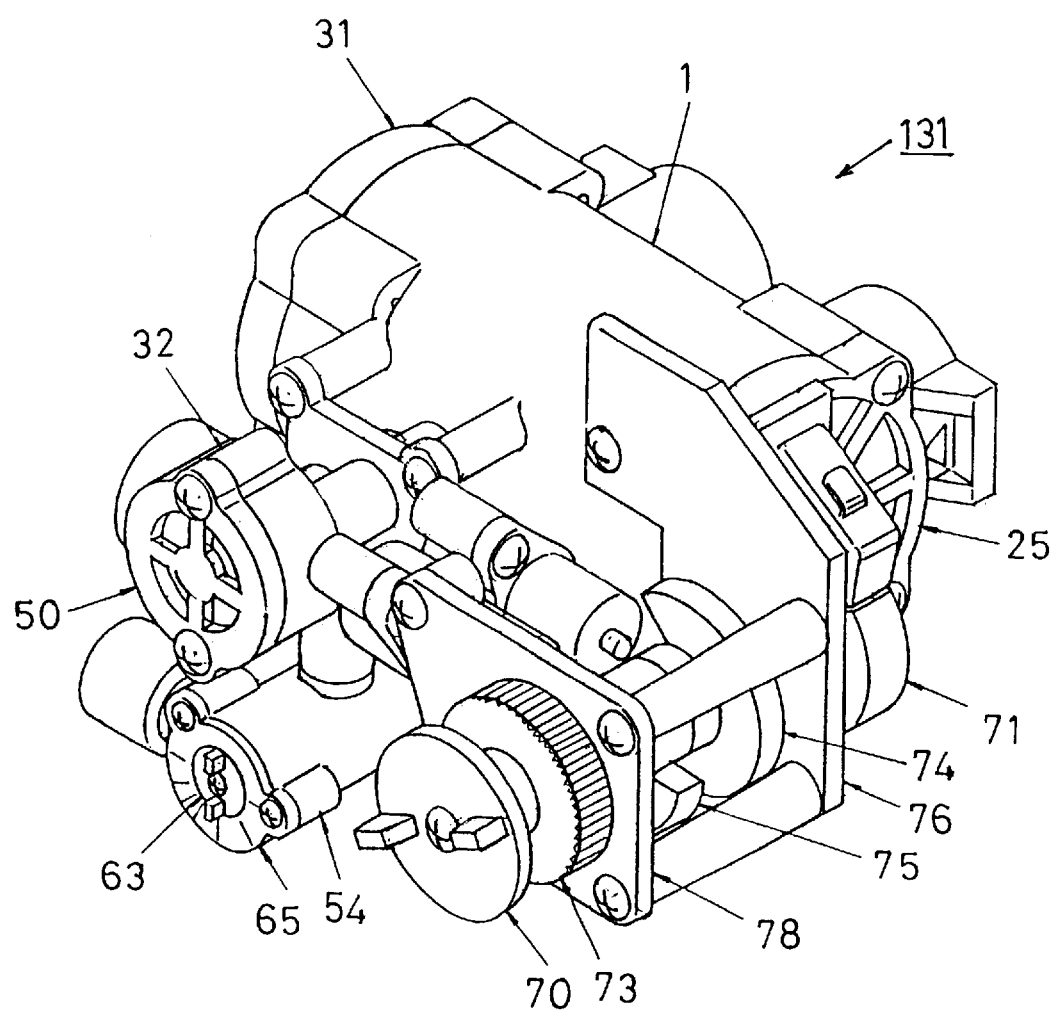
FIG. 3 is a perspective view of the automatic regeneration valve with a timer's main body removed.
Figure 4:
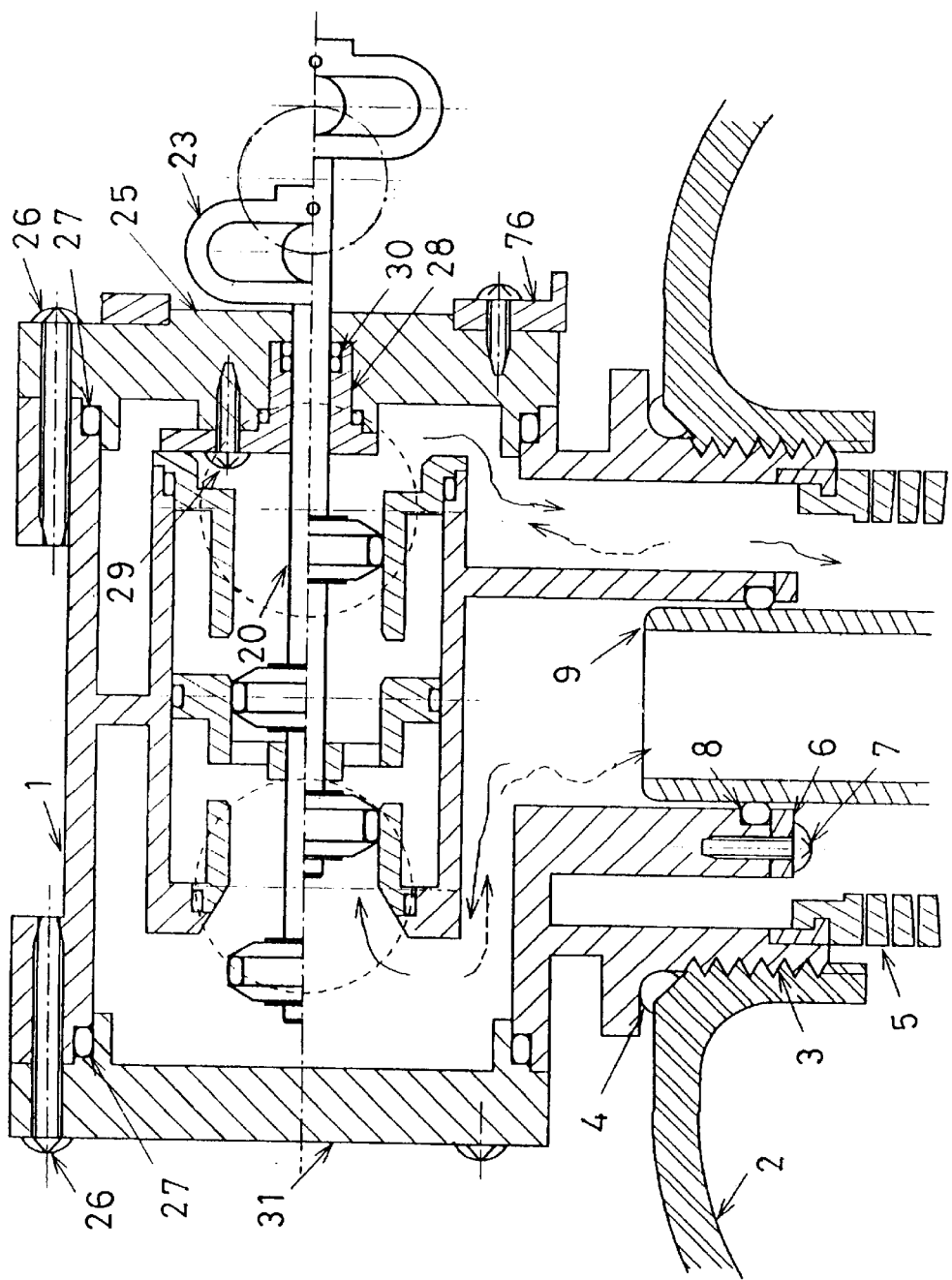
FIG. 4 is a sectional view of the automatic regeneration valve as viewed from the front.
Figure 5:
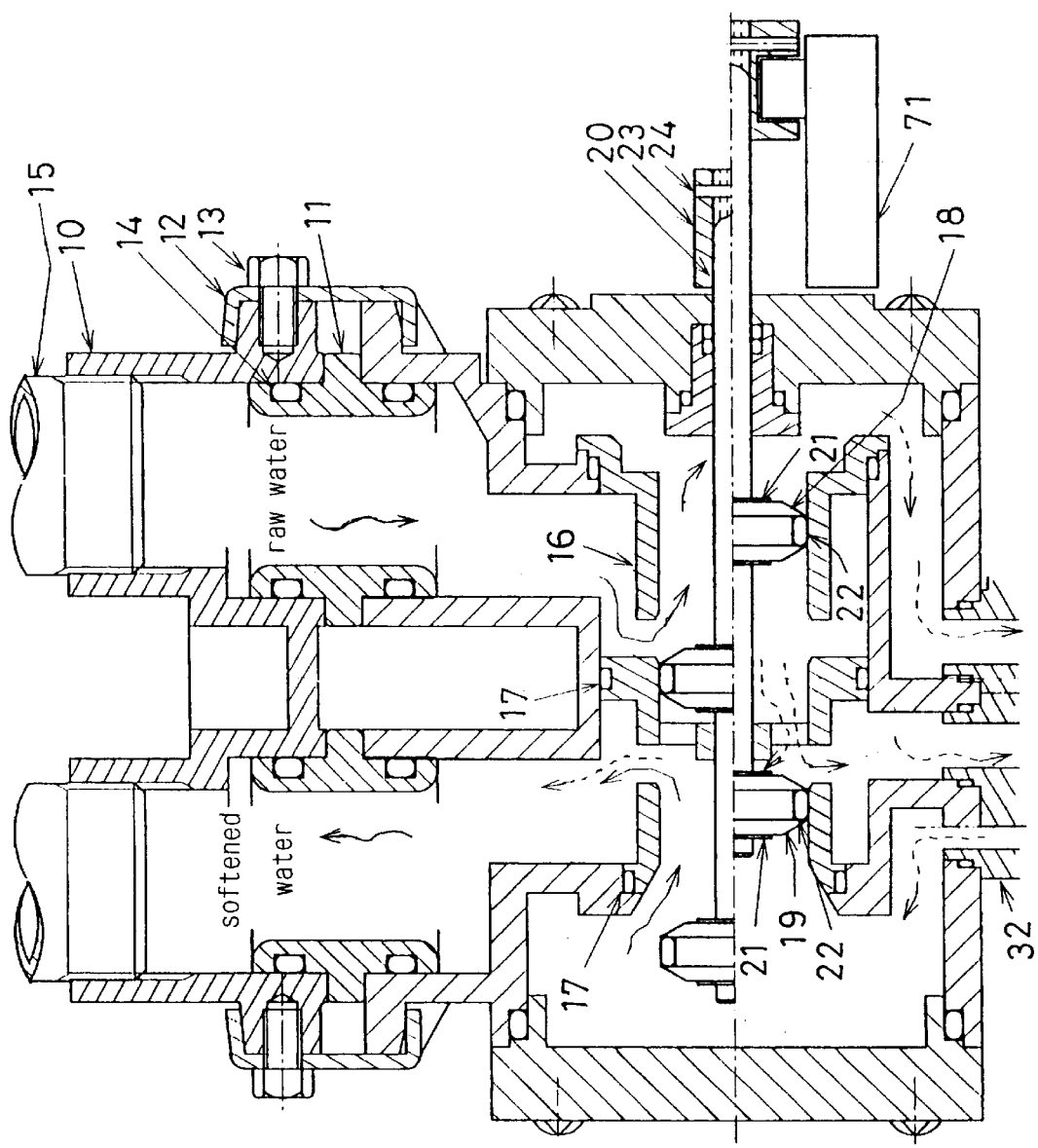
FIG. 5 is a sectional view of the automatic regeneration valve as viewed from the behind.
Figure 6:
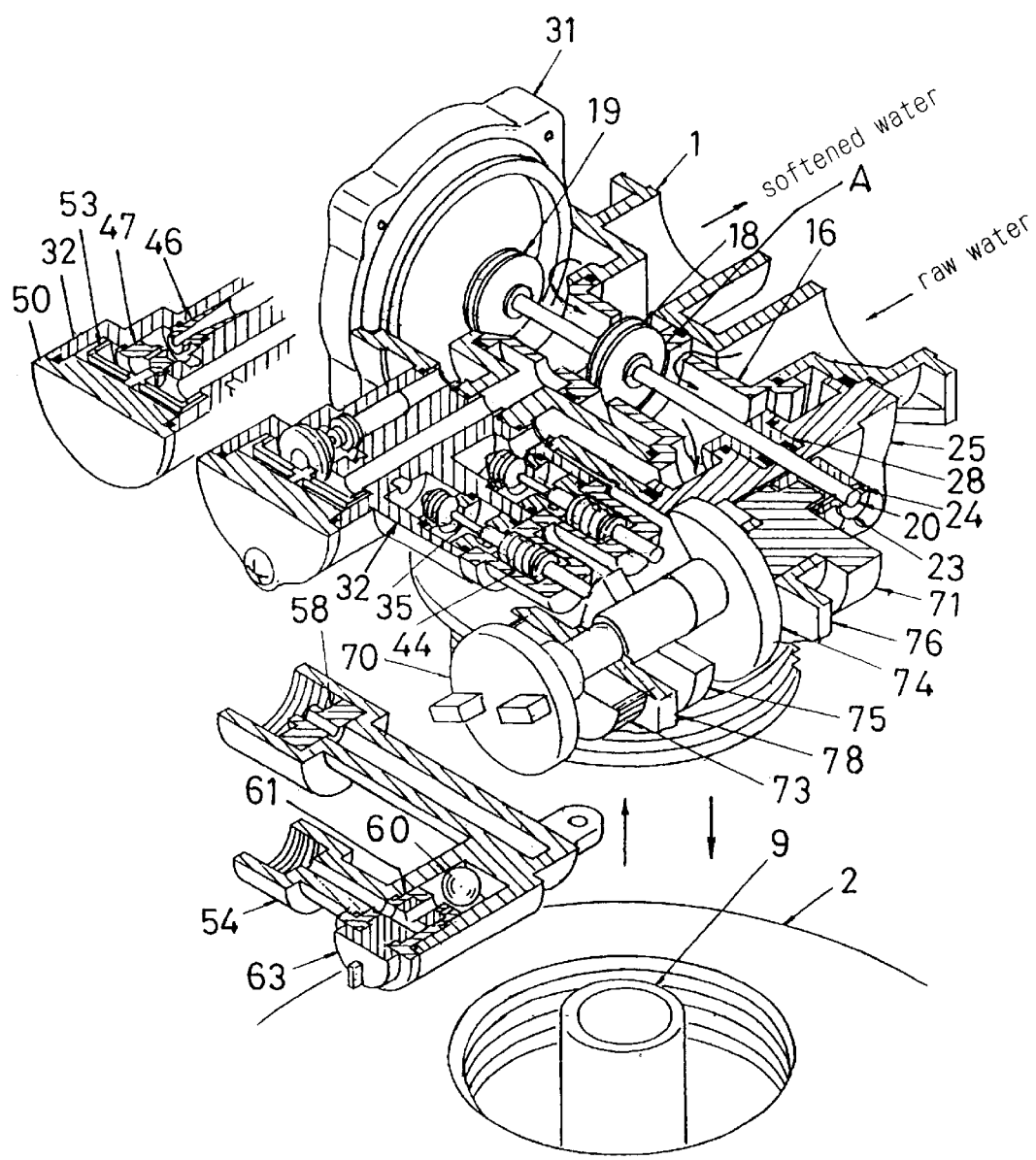
FIG. 6 is an exploded perspective view showing the automatic regeneration valve as the timer mechanism has been removed.
Figure 7:
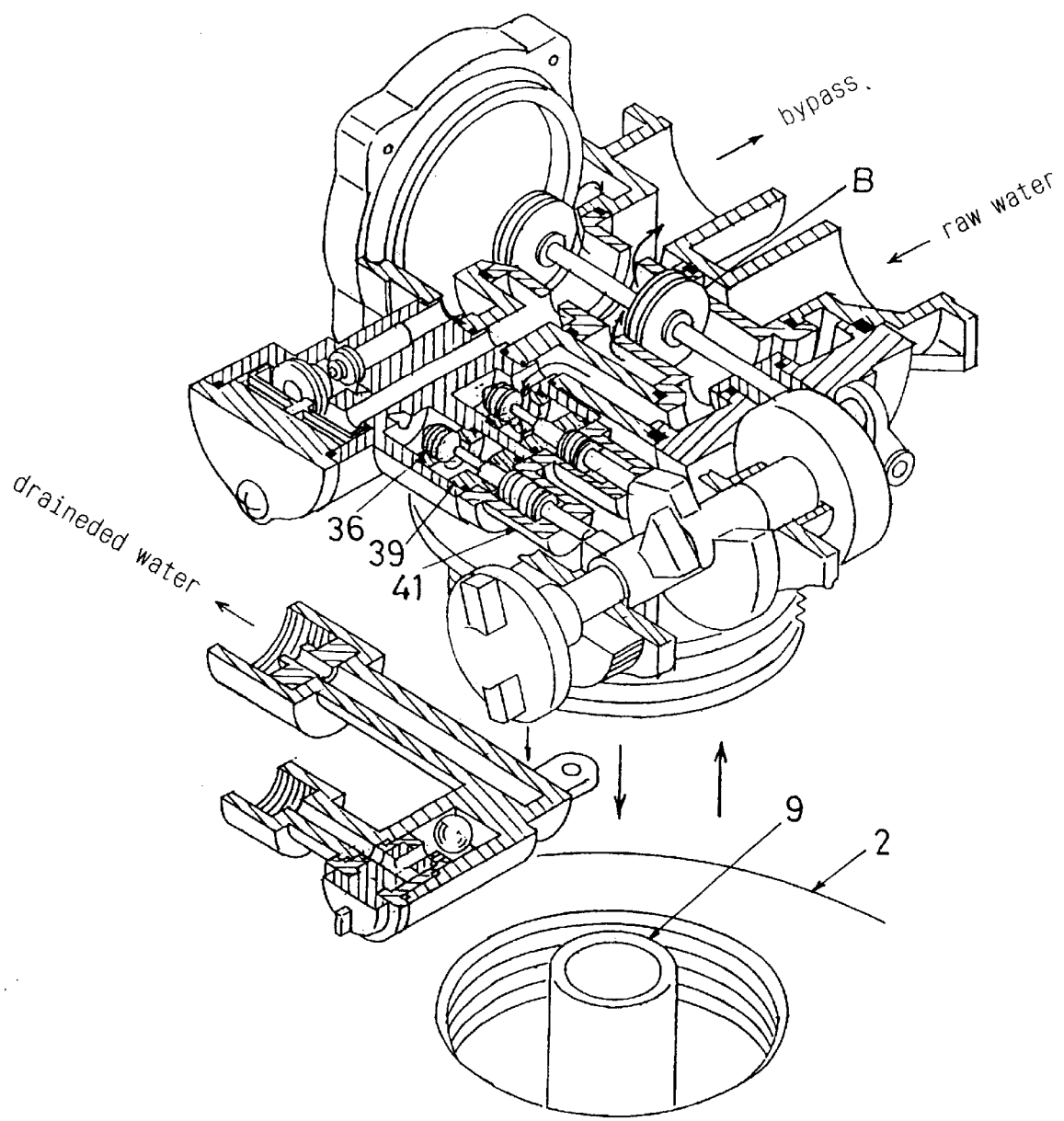
FIG. 7 is another exploded perspective view showing the automatic regeneration valve as the timer mechanism has been removed.
Figure 8:
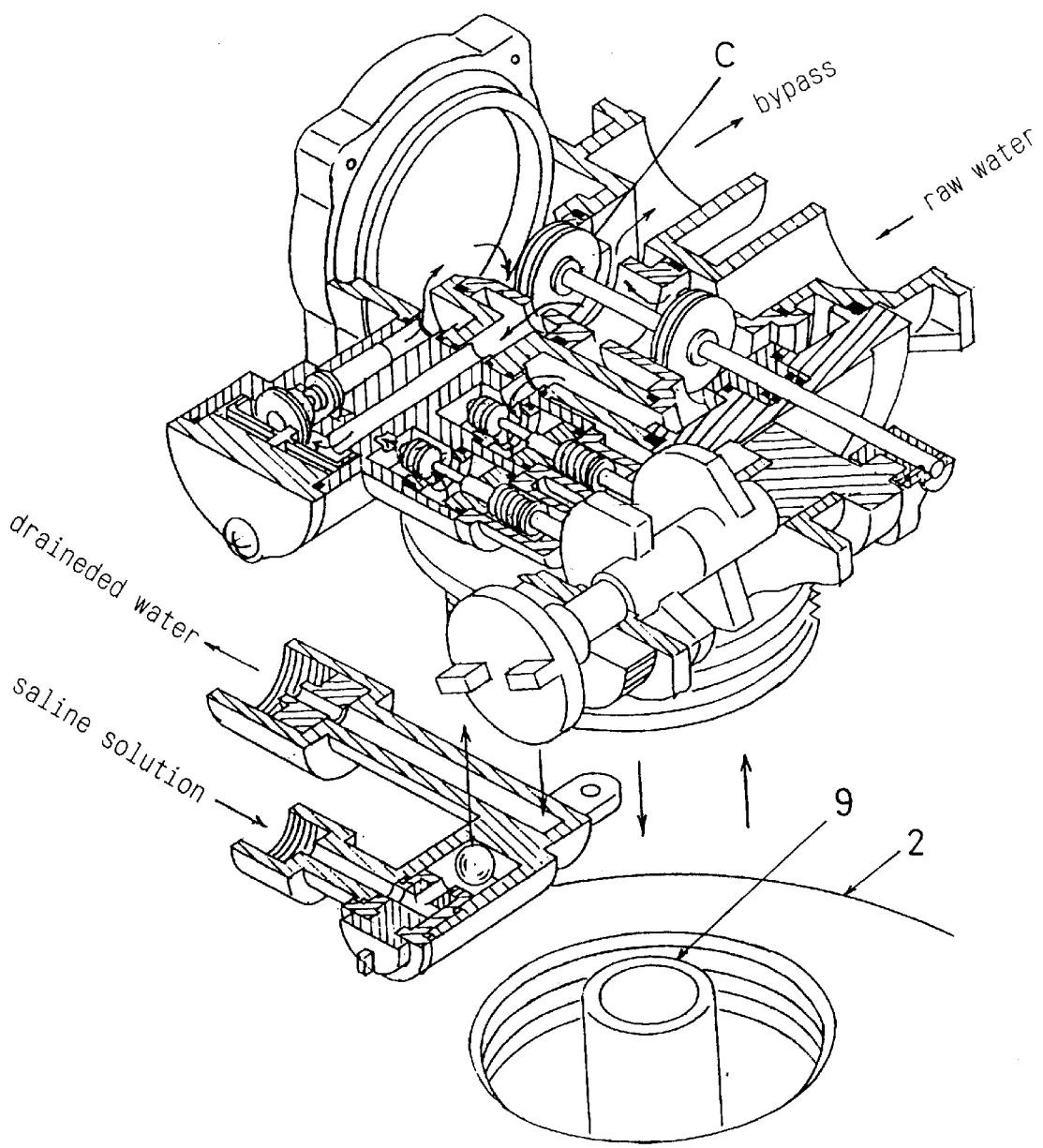
FIG. 8 is still another exploded perspective view showing the automatic regeneration valve as the timer mechanism has been removed.

FIG. 2 is a perspective view of the automatic regeneration valve. FIG. 3 is a perspective view of the automatic regeneration valve with the timer mechanism removed. FIG. 4 is a front sectional view of the automatic regeneration valve. FIG. 5 is a rear sectional view of the automatic regeneration valve. FIG. 6 is an exploded perspective view of the automatic regeneration valve with the timer mechanism removed, in the step of softened water collecting. FIG. 7 is an exploded perspective view of the automatic regeneration valve with the timer mechanism removed, in the steps of back washing and washing. FIG. 8 is an exploded perspective view of the automatic regeneration valve with the timer mechanism removed, in the steps of saline solution injection and expelling out.

A main body of the switching valve (1) is mounted on the resin reservoir (2) by a screw (3) with an O-ring (4) interposed therebetween. The resin filter (5) is mounted on a filter supporting plate (6) by a set screw (7) and said supporting plate (6) supports a water duct (9) with interposition of an O-ring (8).

The main body of the switching valve is laterally provided with the raw water inlet (132) and the softened water outlet (133). Pipe mouthpieces (10) are mounted on said raw water inlet (132) and said softened water outlet (133) by clamps (12) with interposition of joints (11).

Said clamps (12) are mounted on the pipe mouthpieces (10) by set screws (13) and the joints (11) are sealed by O-rings (14). The pipe mouthpieces (10) are formed with pipe threads by means of which respective pipes (15) are connected thereto.

Within the main body (1) of the switching valve, there is provided a cylinder (16) which is sealed by an O-ring (17) so as to define passages of raw water and softened water, respectively.

Said cylinder (16) is provided therein with a piston rod (20) by means of O-rings (21). The piston rod (20) is, in turn, provided a switching piston A (18) and a switching piston B (19) having O-rings (22), respectively. A slider (23) is secured to one end of the piston rod (20) by means of a pin (24).

A front cap (25) is mounted on an end surface of the switching valve's main body (1) by set screws (26) and sealed by O-rings (27). The front cap (25) is formed with an opening through which the piston rod (20) extends and a bearing (28) is mounted in said opening by a set screw (29). This bearing (28) facilitates the piston rod (20) to slide. The bearing (28) is provided with an O-ring (30) to ensure a sealing effect between the bearing (28) and the piston rod (20).

A rear cap (31) is mounted on another end surface of the switching valve's main body (1) by set screws (26) and sealed by an O-ring (27).

A water flow through the switching valve constructed as has been described above will be explained.

(a) Flowing in the Step of Softened Water Collection

Raw water having been introduced through the raw water inlet (132) flows along the raw water side cylinder (16) and the front cap (25) into the filter (5). The amount of water having been softened through the ion exchange resin (130) flows through the water duct (9) and then through the softened water side cylinder (16) into the softened water outlet (133).

(b) Flowing in the Step of Saline Solution Injection

The saline solution is introduced through the raw water inlet (132) to flow in the cylinder (16) to the raw water side of an ejector. The saline solution pumped up by the ejector flows on the side of the rear cap into the water duct (9). The saline solution flows from the water duct (9) into the ion exchange resin layer (130) and the amount of saline solution having been subjected to the ion exchange reaction then flows from the passage defined by the front cap (25) along the outer side of the cylinder (16) to the drainage valve.

(c) Bypass

Raw water introduced through the raw water inlet (132) into the cylinder (16) flows to the softened water outlet (133).

Figure 9:
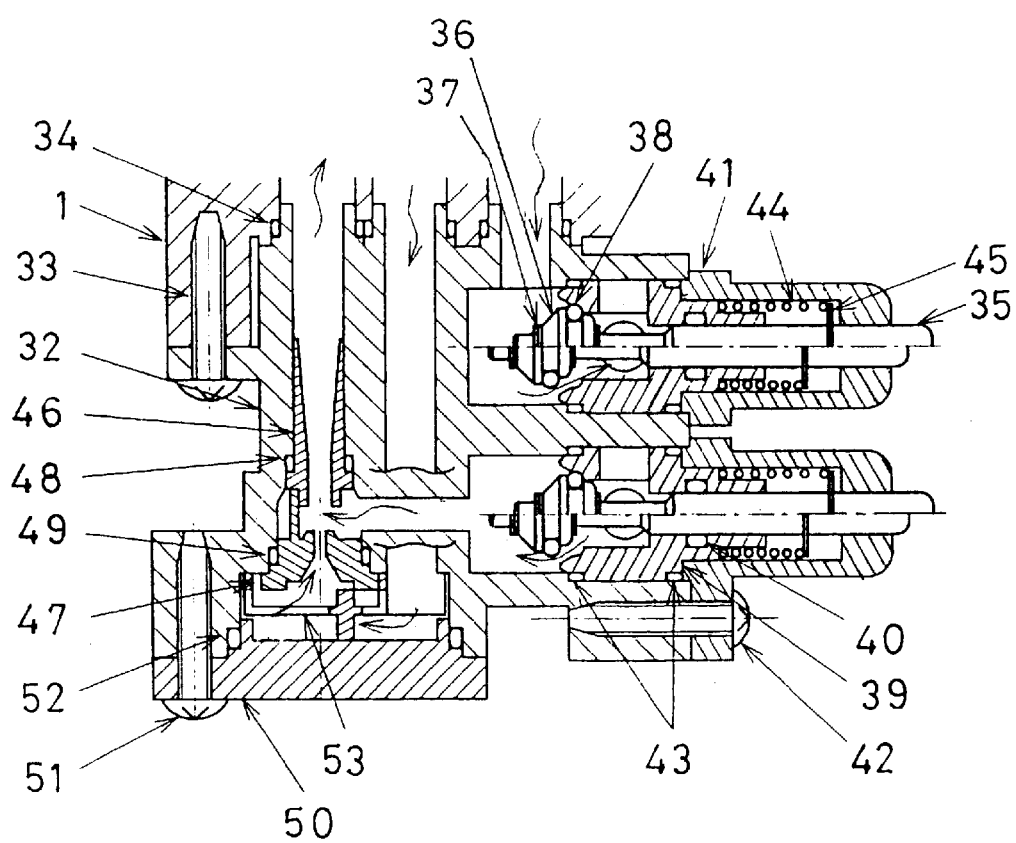
FIG. 9 is a sectional view of the control valve as viewed from the front.

FIG. 9 is a sectional view as viewed from the front, illustrating the control valve.

The control valve (32) including the drainage valve, the saline solution valve and the ejector is mounted on a switching valve (1) by a set screw (33) and sealed by an O-ring (34).

A piston valve body (36) is mounted on a piston rod (35) by means of an E-ring (37) and an O-ring (38) serves as sealing means.

The piston rod (35) is mounted on a piston valve seat (39) to constitute a piston valve. The piston rod (35) is sealed by an O-ring (40).

Said piston valve seat (39) is, in turn, mounted on the control valve (32) and fixed to a piston valve cap (41) by a set screw (42). The piston valve seat (39) is sealed by O-rings (43).

Between the piston rod (35) and the piston seat (39), there is mounted a biasing spring (44) by means of an E-ring (45). The biasing spring (45) enables the piston rod (35) to recover its initial position after it has been pushed forward.

The control valve (32) is incorporated with an ejector seat (46) and an ejector blow-off port (47) sealed by O-rings (48) (49). In addition, an eject or cap (50) is fixed to the control valve (32) by a set screw (51) and sealed by an O-ring (52).

There is provided an ejector filter (53) between said ejector blow-off port (47) and said ejector cap (50).

Water flow occurring in the control valve of such arrangement will be described.

(a) Water Flow in the Step of Saline Solution Injection

Raw water is introduced through the switching valve (1) into the passage defined between the piston valve body (36) and the piston valve seat (39) and flows to the drainage port of the water injection valve.

(b) Water Flow Through the Ejector

Raw water coming from the switching valve (1) flows through the ejector filter (53) and the ejector blow-off port (47). Together with saline solution sucked up thereby, raw water flows to the switching valve (1).

(c) Flow of Saline Solution

Saline solution introduced through the water injection valve into the passage defined between the piston valve body (36) and the piston valve seat (39) flows to the inlet of the ejector.

Figure 10:
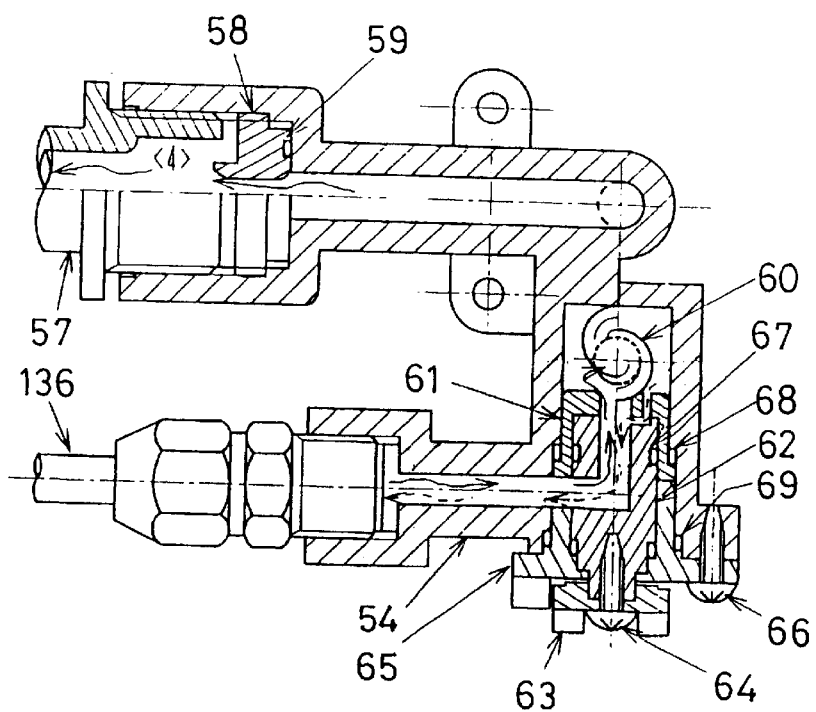
FIG. 10A is a sectional view of the water injection valve as viewed from the front.
FIG. 10B is a side sectional view of the water injection valve.
FIG. 10C is a side view of the water injection valve seat and the water injection valve shaft.
Figure 10:
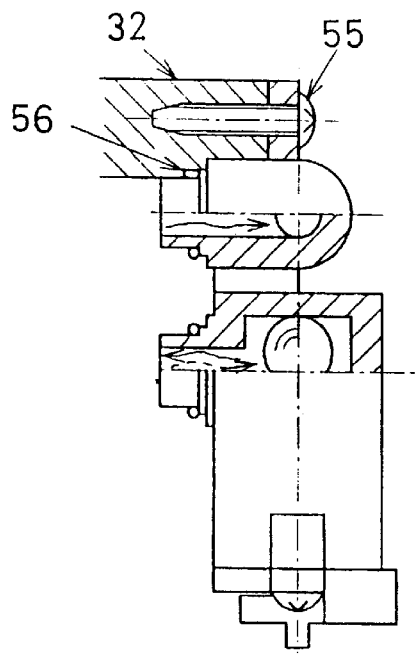
Figure 10:
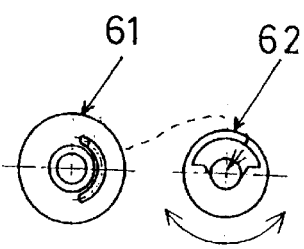
Figure 11:
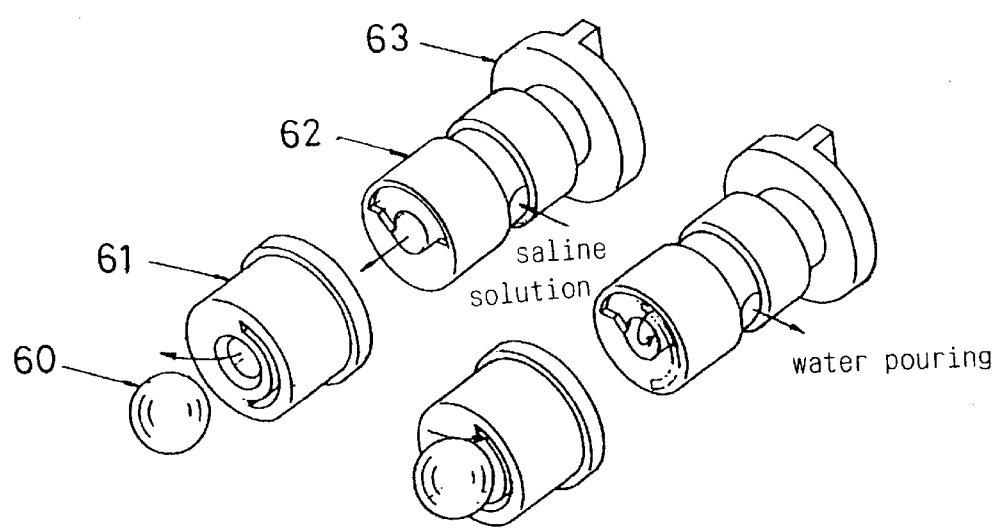
FIG. 11 is a fragmentary perspective view of the water injection valve.

FIG. 10(A) is a sectional view as viewed from the front, FIG. 10(B) is aside sectional view of the water injection valve, FIG. 10(C) is a side view of the water injection valve seat and the water injection valve shaft and FIG. 11 is an exploded perspective view-of the water injection valve.

The water injection valve (54) is mounted on the control valve (32) by a set screw (55) and sealed by an O-ring (56).

The water injection valve (54) is mounted on the control valve (32) by a set screw (55) and sealed by an O-ring (56).

The drainage pipe (57) is formed with a pipe thread on which a drainage controller (58) is mounted so that an amount of drainage may be regulated by an appropriate bore diameter. The drainage controller (58) is sealed by an O-ring (59).

A water injection regulator in the form of the water injection valve of check valve construction has a ball (60) free to roll therein. Said ball (60) opens the passage in the step of saline solution injection and restrict the passage in the step of water injection.

More specifically, a water injection valve seat (61) adapted to receive said ball (60) is formed in its end surface with a water passage defined by a central bore and a narrow fan-shaped slit. A water injection valve shaft (62) is formed in its end surface with a water passage defined by a central bore and a fan-shaped shallow depression. The valve seat (61) cooperates with the valve shaft (62) to check or regulate water injection. No water injection occurs when these water passages are out of coincidence and water injection is restricted or regulated depending on an extent over which these two water passages overlap each other (See FIG. 11).

A water injection valve grip (63) is mounted on another end of the water injection valve shaft (62) by a set screw (64). Said water injection valve grip (63) is provided with a position indicator adapted to indicate an actual position of the grip (63). This position corresponds to an actual position of the fan-shaped shallow depression of the water injection valve shaft (62).

A water injection valve cap (65) is mounted on the water injection valve (54) by a set screw (66) and this cap (65) is provided with graduations. The graduations are marked over an angle of 180° to, indicate an actual position of the water injection valve seat's slit. The water injection valve seat (61), the water injection valve shaft (62) and the water injection valve cap (65) are sealed by O-rings (67)(68)(69), respectively.

In this manner, the amount of water to be injected can be regulated by adjustably setting the mark of the valve grip (63) to the graduations of the valve cap (65).

Water flow through the water injection valve of such arrangement will be described.

(a) Flow of Drained Water

Water drained through the drainage valve flows to the drainage section of the water injection vale and the amount thereof regulated by the drainage controller (58) flows into the drainage pipe (57).

(b) Water Flow in the Step of Saline Solution Injection

Saline solution sucked up by the ejector flows through the saline solution pipe (136) into the central bore of the water injection valve shaft (62). Then saline solution flows along the passage defined between the ball (60) and the water injection valve seat (61) into the saline solution valve.

(c) Water Flow in the Step of Water Injection

Water injected through the saline solution valve flows along the slit of the water injection valve seat (61) and then through the central bore of the water injection valve shaft (62) into the saline solution pipe (136).

Figure 12:
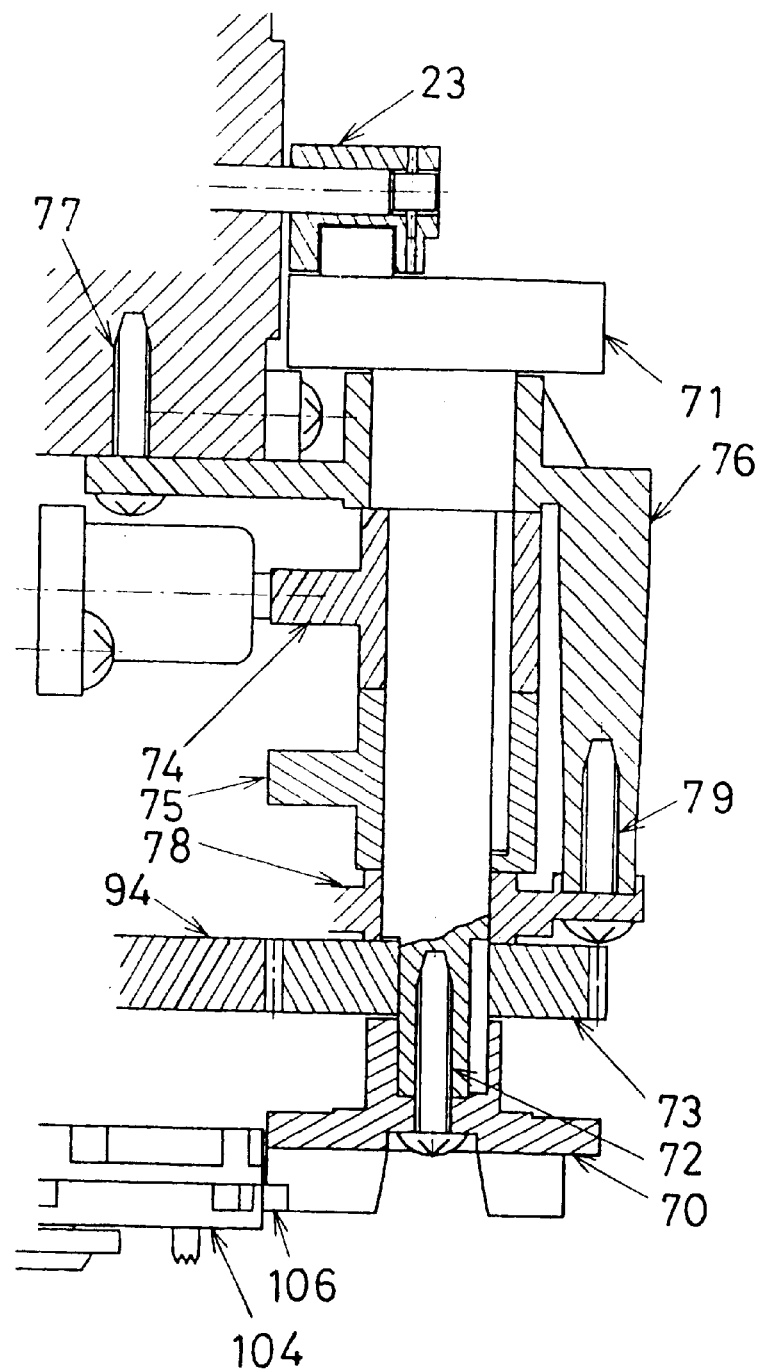
FIG. 12 is a diagram illustrating the cam mechanism.
Figure 13:
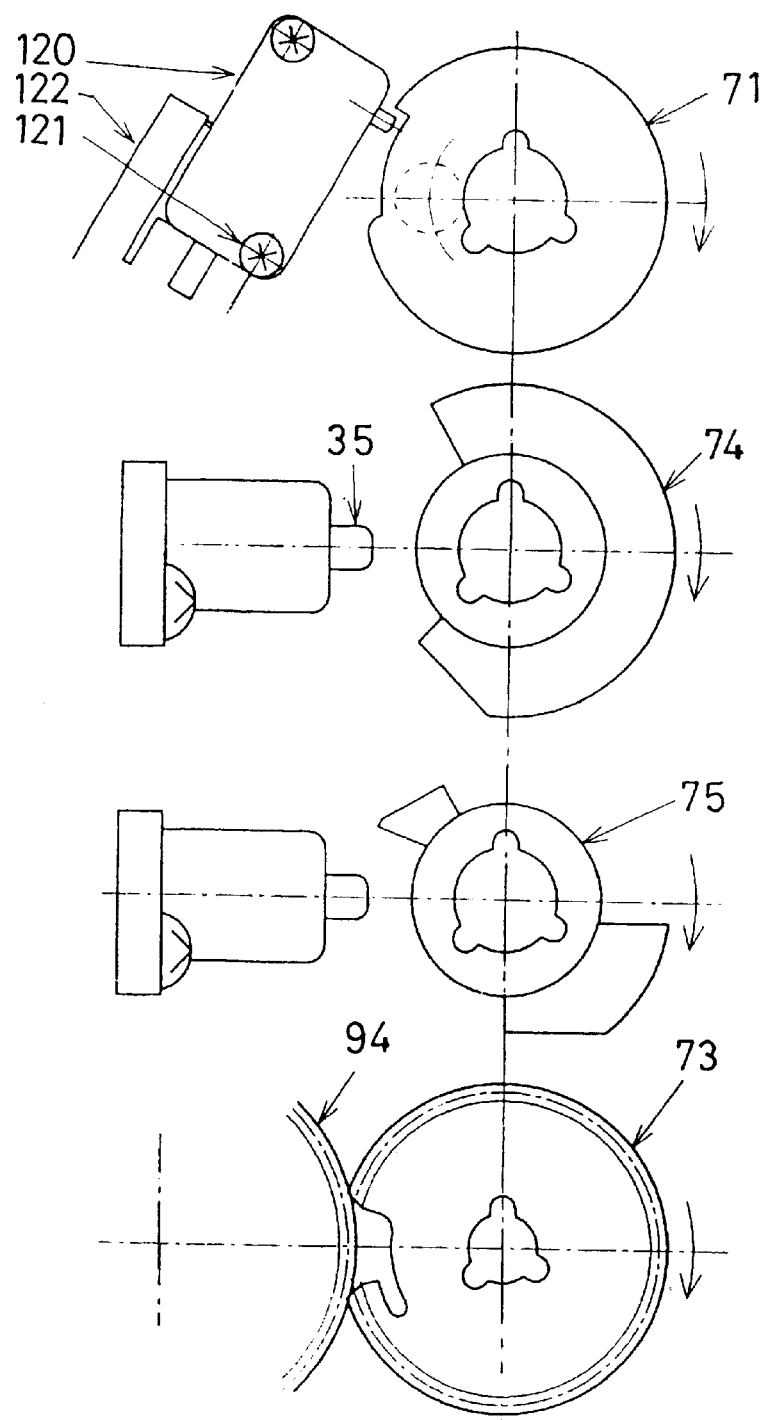
FIG. 13 is a diagram illustrating operation of the cam and the cam shaft.

FIG. 12 is sectional view of a cam mechanism and FIG. 13 is a diagram illustrating a manner in which the cam and the cam shaft operate.

The cam mechanism comprises a piston, an actuator cam for the drainage valve and the saline solution valve, and driving means.

The cam shaft (71) is provided at one end a regeneration lever (70), a regeneration gear (73), a drainage cam (74) and a saline solution cam (75). Transmission of a driving force is achieved by a key-shaped projection of the cam shaft (71). The other end of the cam shaft (71) is shaped like a flange provided with a groove adapted to turn a microswitch (120) ON or OFF.

The regeneration lever (70) is secured to said key-shaped projection of the cam shaft (71) by a set screw (72). A slide pin (106) mounted on a rotatable regeneration day dial (104) kicks and rotates the regeneration lever (70) at a predetermined time point for regeneration. This rotation of the regeneration lever (70) is transmitted to the cam shaft (71) to rotate this cam shaft (71).

The key-shaped projection of the cam shaft (71) has the regeneration gear (73) mounted thereon so that said gear

(73) may be driven by a timer's slide gear (94). Rotation of said gear (73) rotates the cam shaft (71) in a cam shaft bearing (76).

A shaft sleeve (78) cooperates with said cam shaft bearing (76) to stabilize rotation of the cam shaft (71).

The drainage cam (74) and the saline solution cam (75) are operatively associated with the respective piston rods (35) of the drainage valve and saline solution valve. Specifically, respective projections of these cams function to push the piston rods (35) forward and respective depressions of these cams function to retract the piston rods (35).

An actual situation of the regeneration step is determined by relative positions of these cams, the switching piston A (18) and the switching piston B (19).

Teeth of the regeneration gear (73) is partially cut out and normally not driven by the slide gear (94). The cam shaft (71) is rotated as the regeneration lever (70) is rotated and rotation of the cam shaft (71) is followed by the regeneration gear (73). Thus the regeneration gear (73) is rotated into engagement with the slide gear (94) so that said regeneration gear (73) may be driven by said slide gear (94).

After a complete rotation, the cut out portion of the regeneration gear (73) comes in engagement with said slide gear (94) and becomes free from the driving effect of the slide gear (94).

Said cut out portion of the gear (73) is formed with a narrow groove to avoid a possibility that the engagement of these gears (73), (94) might be accompanied with undesirable flexture. The engagement of these gears is thereby facilitated. Such flexture might occur due to preadjustment of a position at which these gears (73), (94) should begin to engage with each other.

Now a manner in which the cam mechanism of such construction transmits the driving force will be described.

(a) At the Start of Regeneration

A driving force is transmitted from the timer to the regeneration lever (70) via the slide pin (106) of the regeneration day dial (104) which, in turn, rotates the cam shaft (71), bringing the regeneration gear (73) into engagement with the slide gear (94).

(b) In the Course of Regeneration

The regeneration gear (73) engaged with the slide gear (94) rotates the cam shaft (71) which, in turn, rotates the drainage cam (74) and the saline solution (75) to move the slider (23).

(c) Completion of Regeneration

The cut out portion of the regeneration gear (73) disengage this gear (73) from the gear (94) and thereby said gear (73) is relieved of the driving force.

Figure 14:
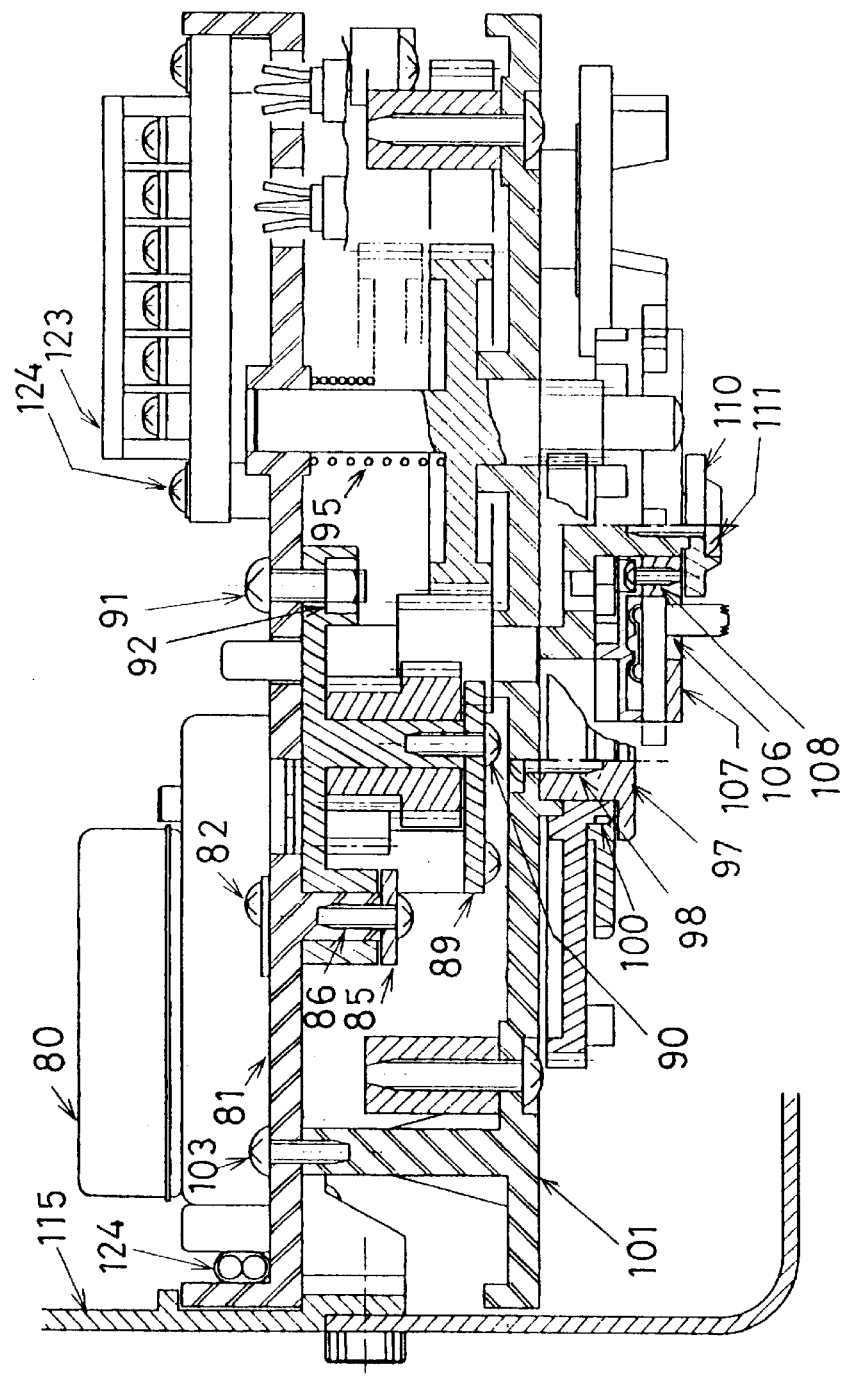
FIG. 14 is a sectional view showing the timer mechanism as viewed from the side.
Figure 15:
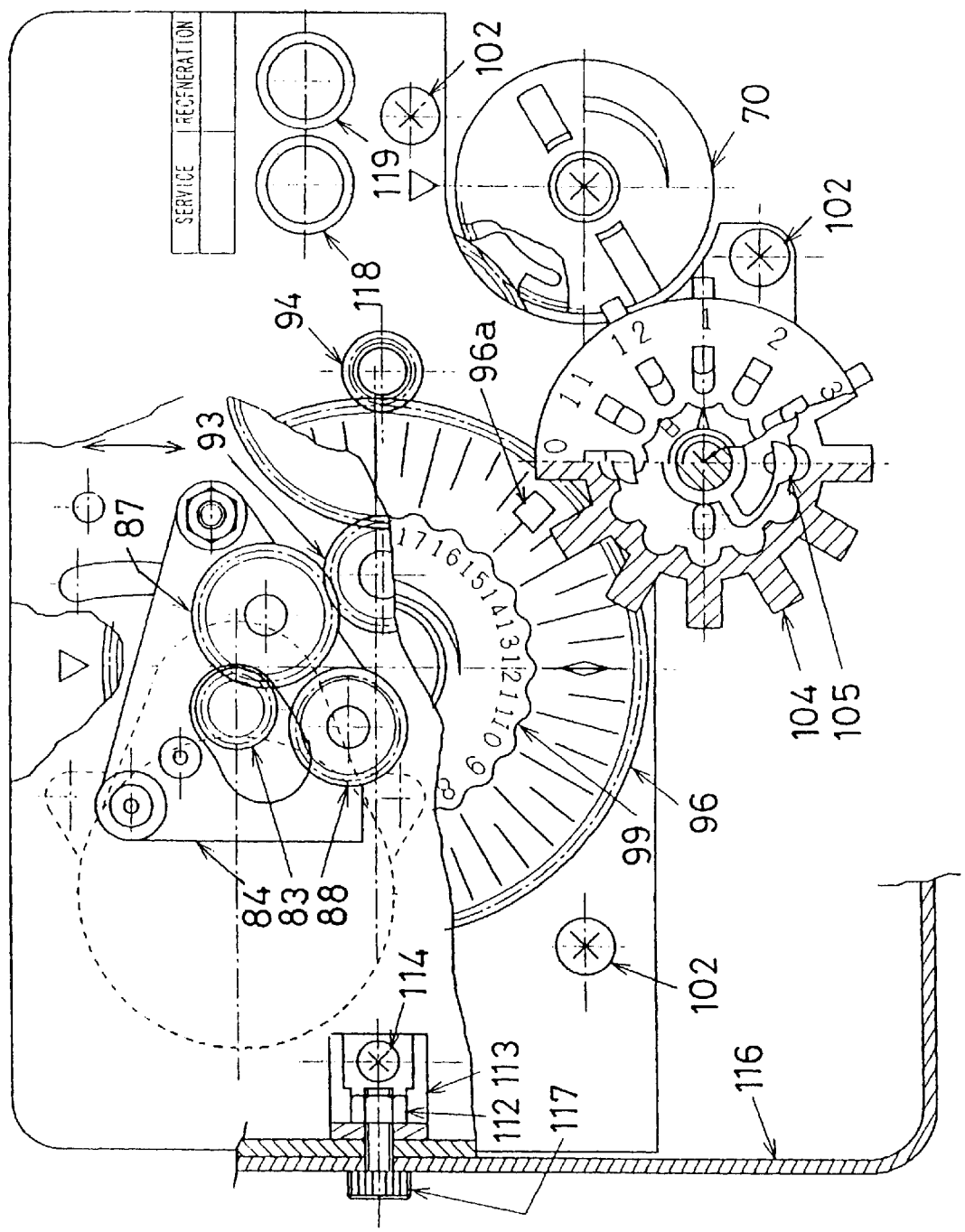
FIG. 15 is a plan view of the timer mechanism.
Figure 16:
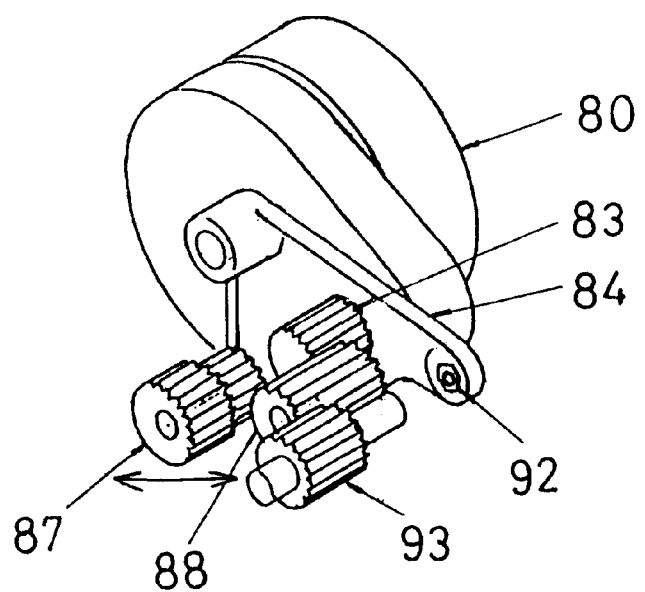
FIG. 16 is a diagram illustrating the cycle gear of the timer motor.
Figure 17:
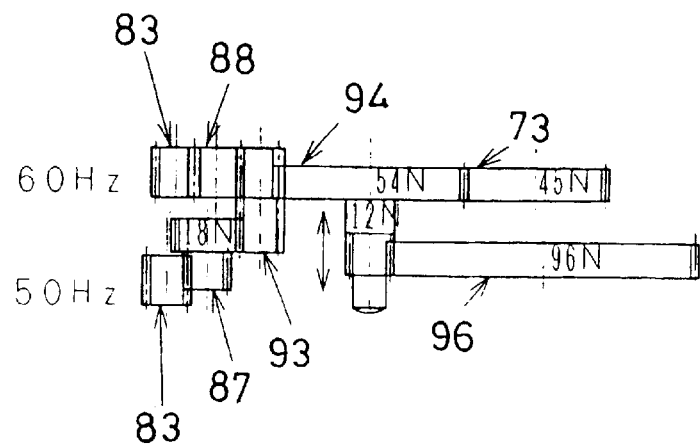
FIG. 17 is a diagram illustrating a manner of engagement between the motor gear and the cycle gear.
Figure 18:
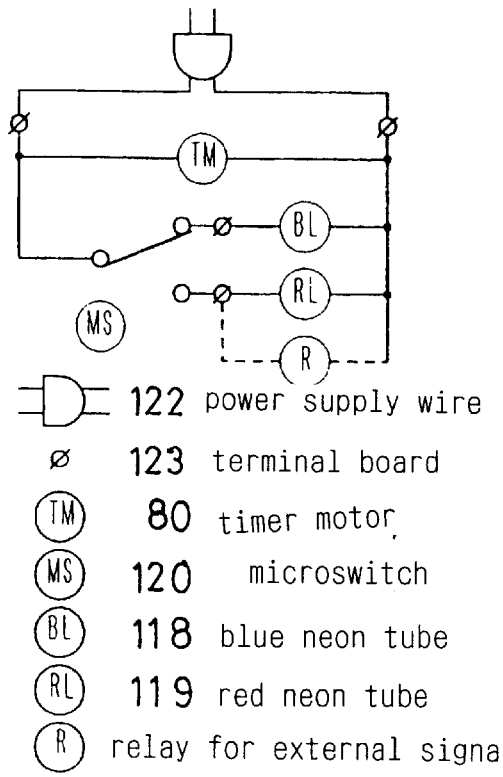
FIG. 18 is a schematic circuit diagram of the electric components.
Figure 19:
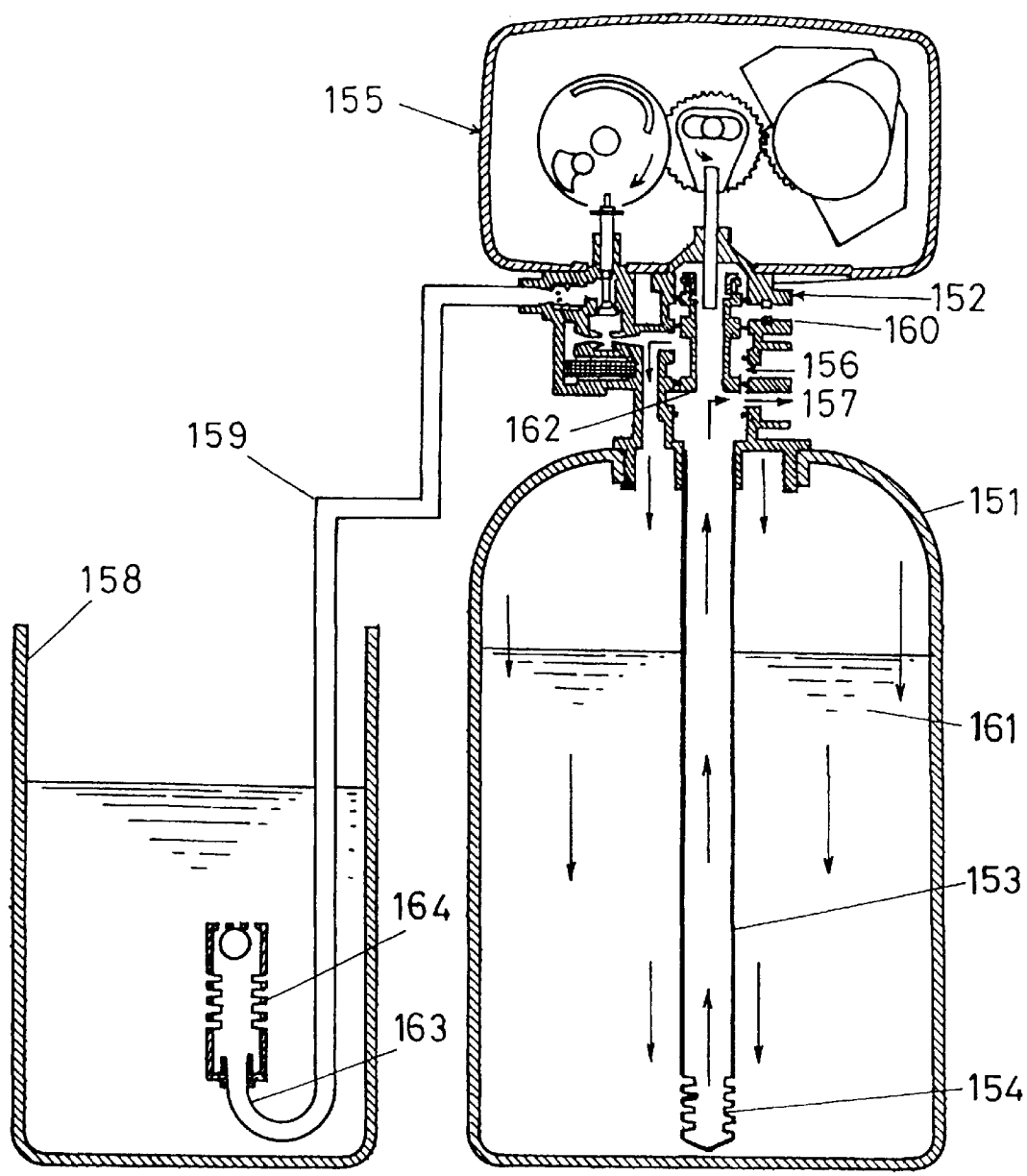
FIG. 19 is a diagram schematically illustrating an example of the conventional water softener.

FIG. 14 is a sectional view of a timer mechanism. FIG. 15 is a plan view of the timer mechanism. FIG. 16 is a diagram illustrating a cycle gear of a timer motor. FIG. 17 is a diagram illustrating a gearing transmission between a motor gear and the cycle gear. FIG. 18 is a schematic circuit diagram of an electric section.

The timer mechanism comprises the timer motor, a clock display, a transmission of the driving force for regeneration, electric components and a cover.

The timer motor (80) is fixed to a timer table (81) by a set screw (82) and the motor gear (83) is mounted on an output shaft of the motor (80). According to an embodiment of the present invention, the timer motor (80) operates at 60 Hz and a reduction gear ratio of 1/40 rpm. The motor gear has 12 gear teeth.

The timer table (81) is provided with a rotatable cycle gear holder (84) which is secured by a set screw (86) to the timer table (81) with interposition of a holder retainer (85).

The cycle gear holder (84) is provided at predetermined positions with a 50 cycle gear (87) and a 60 cycle gear (88). These cycle gears (87), (88) are mounted by a set screw (90) with interposition of a cycle gear cover (89).

The 50 cycle gear (87) is provided in the form of a stepped gear comprising two gear portions. One of these gear portions is adapted to be engaged with the motor gear (83) and the other gear portion is adapted to be engaged with a conversion gear (93). A gear ratio of these two gear portions is 50:60. According to the embodiment of the present invention, said gear ratio is realized by 15 gear teeth to 18 gear teeth. It should be understood that the 60 cycle gear (88) is provided in the form of a straight gear having 15 gear teeth in the case of this embodiment.

The cycle gear holder (84) is secured by a set screw (91) and a nut (92) to the timer table (81) at one of two predetermined positions. One of these two predetermined positions is allocated to 50 cycle and the other is allocated to 60 cycle.

At the position allocated to 50 cycle, the motor gear (83) is engaged with the 50 cycle gear (87). At the position allocated to 60 cycle, the motor gear (83) is engaged with the 60 cycle gear (88). In this way, the water softener can be adapted to the frequency peculiar to a particular region in which the water softener is used.

The conversion gear (93) is supported by a bearing provided in the timer table (81), on one hand, and by a bearing provided in a timer mechanism (101), on the other hand. This gear (93) functions to reverse the rotating direction of the timer motor (80) and has 15 gear teeth in this embodiment.

The slide gear (94) is provided in the form of a stepped gear comprising an input portion and an output portion (having 12 gear teeth and 54 gear teeth), respectively, in this embodiment). In other words, a gear ratio of 2:9 is defined by these two gear portions. This slide gear (94) is supported by a bearing provided in the timer table (81), on one hand, and by a bearing provided in the timer mechanism (101), on the other hand. The slide gear (94) functions to transmit a driving force from the conversion gear (93) to a clock gear (96) and the regeneration gear (73).

A shaft of the slide gear (94) is loaded with a slide spring (95). This spring has its one end bearing against the gear itself of this slide gear (94) and the other end bearing against the timer table (81). The shaft of the slide gear (94) may be pushed against a biasing force of the slide spring (95) to disengage the slide gear from that having been engaged therewith. The biasing force of the slide spring (95) causes the slide gear (94) to restore the normal state of engagement.

Such arrangement of the slide gear (94) advantageously facilitates the slide gear (94) to be disengaged from the clock gear (96) for time setting of the clock gear (96).

Similarly, such arrangement of the slide gear (94) advantageously facilitates the slide gear (94) to be disengaged from the regeneration gear (73) for manual operation of regeneration.

The clock gear (96) is retained by a clock gear retainer (97) secured by a set screw (98) and driven by the slide gear (94). Rotation transmitted from the timer motor (80) is reduced by said slide gear (94) and said clock gear at the respective gear ratios so that the desired clock display may occur with a complete rotation per day.

The clock gear (96) is provided on its predetermined position with a projection adapted to rotate the regeneration day dial (104) so that the process of regeneration may be carried out at a preset time.

A clock disc (99) is disposed between the clock gear (96) and the clock gear retainer (97) with interposition of an O-ring (100) and carries thereon graduations of 24 hours. The time at which the process of regeneration should be started can be set by a procedure as follows: the corresponding graduation is aligned with a regeneration mark ◇ on the clock gear (96); and then the clock gear (96) is rotated until the present time is aligned with a ▽ mark on the timer mechanism (101).

Said timer mechanism (101) is fixed to the shaft sleeve (78) and the control valve (32) by means of a set screw (102). The timer mechanism (101) is fixed also to the timer table (81) by means of a set screw (103). Consequently, the conversion gear (93) and the slide gear (94) are disposed between the timer mechanism (101) and the timer table (81).

The regeneration day dial (104) is provided with a cutout adapted to be engaged with a projection (96a) of the clock gear (96) which functions to rotate said dial (104). The regeneration day dial (104) is further provided with a groove adapted to keep a position of said dial (104) relative to the timer mechanism (101). The regeneration day dial (104) is positioned under a biasing action of a positioning pin (105) as will be described.

Said positioning pin (105) comprises a pin itself received in a long groove of the timer mechanism (101) and a spring biasing said pin itself backward along said groove. In this way, the relative positions of the regeneration day dial (104) and the timer mechanism (101).

The opposite side is formed with irregularities used to position the slide pin (106).

The slide pin (106) is slidably movable in the regeneration day dial (104) in its radial direction and provided with a positioning projection. A spring structure formed integrally with this positioning projection enables the latter to extend radially beyond the projection of the regeneration day dial (104). The day on which the process for regeneration is carried out may be set as "out" and the other days may be set as "in".

A regeneration day dial cap (107) is formed with a groove along which the slide pin can slide and fixed to the regeneration day dial by means of a set screw (108). The slide pin (106) is disposed between said cap (107) and said dial (104).

The regeneration day dial (104) and the regeneration day dial cap (107) assembled together is mounted to the timer mechanism (101) by means of a set screw (111) with interposition of a regeneration, day dial retainer (110). This regeneration day dial assembly can be exchangeable as an unit. According to the embodiment of the present invention, the regeneration date may be set to one of weekdays or to one or more of twelve days.

The timer table (81) is mounted by a nut (112) received in a nut receptacle (113) and a set screw (114). A blue neon tube (118) and a red neon tube (119) are fixed to the timer table (81) by means of nuts. Lead wires of the respective neon tubes are connected to a terminal board (123) are predetermined positions. The blue neon tube (118) is turned ON during collection of softened water and the red neon tube (119) is turned ON during regeneration.

A main cover (115) is installed with its groove engaged with the side wall of the timer table (81) and a front cover (116) is overlapped with said main cover (115). The front cover is fixed to the main cover (115) by threading a decorative screw (117) into the nut (112).

The microswitch (120) is fixed to the terminal board (123) by a set screw (121) with interposition of the cam shaft bearing (76) and a jack (122). The microswitch (120) is turned ON or OFF depending on a position of the groove formed in the cam shaft (71).

The terminal board (123) is fixed to the timer table (81) by a set screw (124). Power line (124) and lead wires of said timer motor (80), blue neon tube (118), red neon tube (119) and microswitch (120) are connected to said terminal board (123) at predetermined, positions.

A driving system for the timer mechanism constructed as has been described above will be described.

(a) A driving system for the timer functioning as a clock starts from the timer motor (80). A driving force output from the timer motor (80) to the motor gear (83) is transmitted to the conversion gear (93). Such transmission occurs via the 50 cycle gear (87) or the 60 cycle gear (88) depending on whether the system is used in 50 Hz region or 60 Hz region. The driving force transmitted to said conversion gear (93) is then transmitted to the clock gear (96) via the slide gear (94). As a result, the clock gear (96) completes a single rotation per day.

(b) During a complete rotation of the regeneration day dial (104) by the clock gear (96), the slide pin (106) rotates the regeneration lever (70) to start the process of regeneration as said pin (106) is set.

(c) Rotation of the regeneration lever (70) brings the regeneration gear (73) into engagement with the slide gear (94) and thereupon drives the drainage cam (74), the saline solution cam (75) and the slider (23) via the cam shaft (71). Thus, the step of regeneration progresses.

Now water flow in the respective steps of the process executed by the water softener constructed as has been described hereinabove will be described.

(a) In the step of collecting softener water, raw water containing the hardening component flows through the raw water inlet (132) into the upper part of the resin reservoir (2). Passing through the ion exchange resin (11), raw water is softened as said hardening component is substituted by Na cation. The amount of water softened in this manner flows through the resin filter (9a) in the water inlet (9b) upward to the softened water outlet (133). This amount of softened water is supplied outward from the softened water outlet (133) to an apparatus using softened water.

As will be apparent from FIG. 6, no amount of raw water can flow into the passage for softened water. This is for the reason that the switching piston A (18) occupies the position at which said piston A (18) seals this passage.

Both the drainage valve and the saline solution valve are closed at this time point and there is no possibility that any amount of softened water might flow out from these valves.

(b) The step of "back washing" is the first step after the automatic regeneration valve (131) has been switched to the step of regeneration. This switching occurs under control of the timer control mechanism after collection of softened water has continued for a predetermined period or a predetermined amount of softened water has been discharged. Raw water introduced into the raw water inlet (132) flows through the automatic regeneration valve (131), the water duct (9) and the water inlet (9b) into the resin reservoir (2). Then raw water flows upward in the resin reservoir (2), loosening the layer (130) of ion exchange resin layer, through the automatic regeneration valve (131) to the drainage port (134). Waste water is drained out from the system through this drainage port (134). In this manner, water flow occurs in the direction opposed to the direction in said step of collecting softened water.

More specifically, the switching piston A (18) mounted on the slider (24) moves rightward as viewed in FIG. 7 and switches the sealing position to "B". Thereupon, the drainage cam (74) coaxial with the piston rod (20) is rotated to open the drainage valve.

Consequently, raw water is guided through the water duct (9), then the resin filter (9a) to flow through the layer of ion exchange resin (130) from its bottom toward its top. Flowing through said layer of ion exchange resin (130), raw water loosens the ion exchange resin (130) and is drained through the drainage valve.

While raw water may be supplied to the softened water side as a bypass flow, such bypass flow will be blocked if the softened water side is closed on this time point.

In this step of "back washing", any amount of suspension accumulated in the ion exchange resin (130) during collection of softened water is washed away from the system. At the same time, the layer of ion exchange resin (130) tightened during collection of softened water is loosened. Said layer loosened in this manner ensures homogeneous catalytic reaction between saline solution and the ion exchange resin (130) in the subsequent "step of saline solution regeneration".

(c) In "the step of saline solution regeneration", the automatic regeneration valve (131) occupies the position allocated to this step. i.e., at this position, only the amount of raw water having passed through the injector within the automatic regeneration valve (131) can flow into the resin reservoir (2). Under suction effect of the injector mechanism, saline solution is sucked from the saline solution reservoir (135) through the saline solution pipe (136) and the air chuck (138). Saline solution sucked in this manner is mixed with raw water injected from the injector and the mixture is introduced into the upper part of the resin reservoir (2).

Saline solution introduced into the resin reservoir (2) functions to elute the hardening component adsorpted on the ion exchange resin (130). In the place of said hardening component, Na cation is then adsorbed on the ion exchange resin (130).

Waste water containing the hardening component thus eluted is introduced through the water inlet (9b) and the water duct (9) to the drainage port (134). From the drainage port (134), waste water is drained away from the system.

More specifically, the switching piston B (19) mounted on the slider (24) moves rightward as viewed in FIG. 8 and switches the sealing position to "C".

Thereupon, the saline solution cam (75) coaxial with the piston rod (20) is rotated to open the saline solution valve. As a result, raw water is ejected from the ejector and sucks saline solution from the saline solution reservoir (135). The mixture flows through the resin filter (9a), the water duct (136) and the layer of ion exchange resin (130) in which the ion exchange occurs before drained away.

(d) A compressed air introducing mechanism (not shown) is provided in the inlet (137). This mechanism is activated as the level of saline solution lowers within the saline solution reservoir (135) near to the inlet (137) of the air chuck (138). The inlet (137) is thereby closed to prevent any amount of air from flowing into the saline solution pipe (136). At the same time, a negative pressure is maintained within the saline solution pipe (136) under a suction effect of the injector.

Under such condition, only a small amount of raw water having been injected from the injector continues to flow into the resin reservoir (2). Such small amount of raw water slowly expels saline solution out from the resin reservoir (2). This is "the step of expelling out".

Purpose of this "step of expelling out" is to maintain the ion exchange resin (130) in contact with saline solution as long as possible to improve an efficiency at which the ion exchange resin (130) is regenerated.

(e) In "the step of washing", raw water is supplied through the raw water inlet (132) to the upper part of the resin reservoir (2). Any amount of saline solution remaining within the resin reservoir (2 is thereby drained away from the system through the water inlet (138), the water duct (136), the automatic regeneration valve (131) and the drain pipe.

More specifically, the switching piston B (19) moves leftward from the sealing position "C" as viewed in FIG. 7 and opens the passage.

Thereupon, the saline solution cam (75) coaxial with the piston rod (20) is rotated to close the saline solution valve. Consequently, raw water is guided through the water duct (136), the resin filter (9b) so as to flow upward through the layer of ion exchange resin (130). Any excessive salinity is thereby washed and drained away through the drainage valve.

It should be understood that an amount of water sufficient to completely expel saline solution out of the system must be consumed in "the step of washing". This is for the reason that any amount of saline solution may harmfully affect the apparatus using softened water.

(f) In the step of water injection which is the final step of the regenerating process, the amount of saline solution having been consumed in said step (c) is filled up. Specifically, the amount of raw water corresponding to the amount of saline solution consumed in the precedent step (c) is injected into the saline solution reservoir (135). To this end, said amount of raw water is made flow back through the injector mechanism provided within the automatic regeneration valve (131).

More specifically, the drainage cam (74) coaxial with the piston rod (20) is rotated to close the drainage valve, as shown in FIG. 8.

At the same time, the saline solution cam (75) coaxial with the piston rod (16) is rotated to open the saline solution valve. Raw water passing through the saline solution valve has its flow rate regulated by the water injection regulator valve. Thus the desired amount of raw water is supplied to the saline solution reservoir (135) via the air chuck (138) and the saline solution filter.

Then the switching piston A (18) moves back to the sealing position "A". Thereupon, the saline solution cam (75) coaxial with the piston rod (20) is rotated to close the saline solution valve.

The process now returns to said step (a). In the course of the process from the step of back washing (b) to the step of water injection (f), raw water is supplied as bypass flow to the side of softened water.

As will be apparent from the foregoing description of the embodiment, the automatic regeneration valve comprises the switching valve, the control valve, the water injection valve, the cam mechanism and the timer mechanism. These components are compactly integrated in the form of a single valve assembly. With an advantageous consequence, the ion exchange resin layer within the resin reservoir can be uniformly activated and the process of regeneration can be achieved at a high efficiency.

The progress of automatic regeneration is successively carried out as a plurality of switching pistons are successively reciprocated. These switching pistons are arranged within the switching valve which is, in turn, provided within the automatic regeneration valve. Such construction enables the process of regeneration to be reliably achieved by a relatively simplified operation.

Furthermore, the cam mechanism including the drainage valve cam, the saline solution valve cam, the regeneration control lever etc. enables the process of regeneration to be continuously carried out.

Moreover, the single timer motor enables the automatic regeneration to be continuously carried and, in addition, enables the regeneration cycle to be set on one of week days or one or more of 12 days. Operation of regeneration can be manually carried out at any time by disengaging the conversion gear mounted on the timer motor from the regeneration gear.

The system can be used in the 50 Hz region as well as in the 60 Hz region so far as the intermediate gear associated with the timer motor is appropriately switched.

Any way, the automatic regeneration valve according to the present invention is distinguished from that of prior art which relies upon reciprocation of a single piston. According to the invention, the timer mechanism enables the automatic regeneration to be performed at a preset hour on a preset day. In addition, the timer mechanism enables the steps of back washing, saline solution injection, expelling out, washing and water injection to be continuously carried out in full automatic fashion. Furthermore, the present invention enables the ion exchange resin within the resin reservoir to be uniformly regenerated and thereby provides a highly efficient water softener.

While the relatively small-scaled water softener using the water ducts has been described above as a specific embodiment, the present invention is not limited to such embodiment. The present invention is applicable also to a large-scaled water softener using no water duct.

EFFECT OF THE INVENTION

The switching valve contains therein a plurality of switching pistons having their piston rods each extending vertically. The steps of the regenerating process successively take place as positions of these switching pistons are switched. In this way, the process of regeneration is reliably carried out with a relatively simplified construction.

According to the embodiment defined by claim 2, the switching valve contains therein a plurality of switching pistons having their piston rods each extending vertically. The steps of the regenerating process successively take place as positions of these switching pistons are switched. In this way, the process of regeneration is reliably carried out with a relatively simplified construction.

The cam mechanism includes the drainage valve actuating cam, the saline solution valve actuating cam and the regeneration control lever. Such construction enables the process of regeneration to be continuously carried out.

The regeneration control lever provided in the cam mechanism is actuated by the timer mechanism. Such construction enables the process of regeneration to be continuously carried out in full automatic fashion.

The timer mechanism comprises the timer motor provided with the switching gear adapted to be switched between 50 Hz and 60 Hz. Such feature enables the system to be used in the 50 Hz region as well as in the 60 Hz region using the simplified construction.

The timer motor provided in the timer mechanism is provided with the conversion gear. This conversion gear may be operated to switch a regeneration mode to a manual regeneration mode and to start the operation of regeneration at any time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic regeneration valve in a water softener having a resin reservoir filled with ion exchange resin, a saline solution reservoir containing saline solution used to regenerate said ion exchange resin, and an automatic regeneration valve to which a raw water duct supplying said resin reservoir with raw water, a softened water duct feeding the amount of water having been softened in said resin reservoir forward, a drained water duct draining the amount of water used to regenerate said ion exchange resin and a saline solution duct for suction as well as injection from and to said saline solution reservoir so that said automatic regeneration valve may be switched at a predetermined time from a step of softened water collection to successive steps of a process for ion exchange resin regeneration, said automatic regeneration valve comprising a switching valve, a control valve, water injection valve, a cam mechanism and a timer mechanism, wherein the timer mechanism comprises a timer motor provided with a switching gear adapted to be switched between 50 Hz and 60 Hz.

2. The automatic regeneration valve in the water softer according to claim 1, wherein said switching valve contains therein a plurality of switching pistons having their piston rods each extending vertically so that respective steps of a regenerating process may successively take place as positions of these switching pistons are switched.

3. The automatic regeneration valve in the water softener according to claim 1 or 2, wherein the cam mechanism includes a drainage valve actuating cam, a saline solution valve actuating cam and a regeneration control lever.

4. The automatic regeneration valve in the water softener according to claim 3, wherein a regeneration control lever provided in the cam mechanism is actuated by said timer mechanism.

5. The automatic regeneration valve in the water softener according to claim 1, wherein the timer motor of the timer mechanism is provided with a conversion gear so that this conversion gear may be operated to switch a regeneration mode to a manual regeneration mode.

* * * * *